United States Patent Office 3,363,003
Patented Jan. 9, 1968

3,363,003
PHENOXY SUBSTITUTED ALKANOLS
William A. Bolhofer, Frederick, Pa., assignor to Merck & Co., Inc., Rahway, N.J., a corporation of New Jersey
No Drawing. Filed June 16, 1964, Ser. No. 375,639
3 Claims. (Cl. 260—613)

This application is a continuation-in-part of my co-pending application Ser. No. 369,000, filed May 20, 1964.

This invention relates to a new class of phenoxy substituted alkanol compounds which are useful as hypocholesterolemic agents in the treatment of atherosclerosis and which are also useful as chemical intermediates in the preparation of other pharmacologically active products.

The bulk of medical evidence supports the concept that cholesterol is a major factor in the pathogenesis of atherosclerosis because along with other lipids and fibrin it accumulates in the arterial wall and produces arterial corrosion. It has now been found that the phenoxy substituted alkanols of this invention effect a significant reduction in serum cholesterol and thus alleviate the condition associated with blood lipid and fibrin deposition. Thus, in comparisons with other known compounds, the products of this invention compare most favorably in protecting against induced hypercholesterolemia by effecting a marked decrease in the concentration of cholesterol in serum.

The phenoxy substituted alkanols of this invention are compounds having the following structural formula:

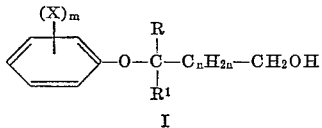

I wherein R and $R^1$ represent similar or dissimilar lower alkyl radicals, e.g., methyl, ethyl, propyl, etc.; X is a member selected from the group consisting of hydrogen, halogen, e.g., chlorine, bromine, fluorine, etc., lower alkyl, e.g., methyl, ethyl, etc., halo-lower alkyl, e.g., trihalomethyl such as trifluoromethyl, etc., cycloalkyl, e.g., mononuclear cycloalkyl containing from five to six nuclear carbon atoms such as cyclopentyl, cyclohexyl, etc., lower alkoxy, e.g., methoxy, ethoxy, etc., lower alkylthio, e.g., methylthio, ethylthio, etc., aryl, e.g., phenyl, tolyl, xylyl, etc., aralkyl, e.g., benzyl, phenethyl, etc., aryloxy, e.g., phenoxy, etc., araloxy, e.g., benzyloxy, etc., alkenyl, e.g., lower alkenyl such as vinyl, allyl, etc., aralkenyl, e.g., styryl, etc., and, taken together, two X radicals on adjacent carbon atoms of the benzene ring may be combined to form a hydrocarbylene chain (i.e., a divalent organic radical composed solely of carbon and hydrogen) containing from three to four carbon atoms between their points of attachment, for example, 1,3-butadienylene (i.e., —CH=CH—CH=CH—), etc.; $m$ is an integer having a value of 1–3; and $n$ is an integer having a value of 0–4.

A preferred embodiment of this invention is the class of phenoxy-alkanols represented by the following structural formula:

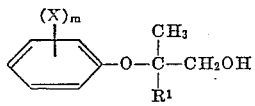

wherein $R^1$ is lower alkyl, preferably methyl; X is halogen; and $m$ is an integer having a value of 1–3. The above class of compuonds exhibits particularly good hypocholesterolemic activity and represents a preferred subgroup of compounds within the scope of this invention.

The products of the invention are conveniently prepared by the reduction of an appropriately substituted phenoxy-alkanoic acid with an hydride reducing agent as, for example, with lithium aluminum hydride. In general, the process proceeds most satisfactorily under ordinary reaction conditions but, in the case of ether-soluble acids, it is usually most advantageous to carry out the reduction by adding an ethereal solution of the phenoxy-alkanoic acid reactant to an ether solution of the hydride. Usually, the addition of the acid to the hydride causes an exothermic reaction to occur and, therefore, it is generally most desirable to add the acid slowly and at such a rate as to maintain the ether solution in a state of gentle reflux. Also, while I prefer to conduct the reaction in an anhydrous ethyl ether solution, it will be appreciated by those skilled in the art that any one of a variety of other solvents such as tetrahydrofuran, dioxane, etc., may also be employed with good results. Finally, the reaction mixture obtained by treatment of the acid with hydride is decomposed by the careful addition of water, followed by acidification with a suitable acid, e.g., a dilute hydrochloric acid solution, to separate out the desired product. The following equation illustrates the process:

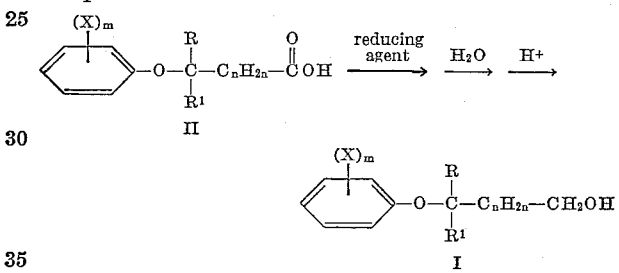

wherein the radicals R, $R^1$, X, $m$ and $n$ are as defined above and $H^+$ represents the cation derived from a suitable acid, e.g., a dilute aqueous hydrochloric acid solution. The amount of reducing agent employed in the process varies with the type of phenoxy-alkanoic acid reactant employed; however, when lithium aluminum hydride is the reagent of choice it is usually most practical to employ up to two moles of hydride per mole of carboxylic acid reactant.

As indicated above, the compounds of this invention are useful in the treatment of atherosclerosis by virtue of their ability to reduce the concentration of cholesterol in blood serum. However, it has also been found that the instant phenoxy substituted alkanols are useful as chemical intermediates and, if desired, may be oxidized by a mixture of dicyclohexylcarbodiimide and anhydrous dimethylsulfoxide to produce their corresponding aldehydo derivatives. Also, the aldehydo derivatives thus produced may be treated further with a 2-haloalkanoic acid ester in the presence of zinc according to the process disclosed in my copending application Ser. No. 369,000, filed May 20, 1964, to produce a pharmacologically active phenoxy substituted 3-hydroxyalkanoic acid derivative. Both the aldehydo and phenoxy substituted 3-hydroxyalkanoic acids thus produced are useful in the treatment of atherosclerosis and pharmacological tests show that, in comparison with other known compounds, these derivatives compare most favorably in protecting against hypercholesterolemia by effecting a reduction in the concentration of cholesterol in serum.

The following examples illustrate the method of preparing the phenoxy substituted alkanols of the invention. However, the examples are illustrative only and are not to be construed as limiting the invention thereto. One skilled in the art will readily perceive that, by substituting the appropriate phenoxy substituted alkanoic acid for the carboxylic acid reactants employed in the following examples, all of the products falling within the scope of Formula I, supra, may be prepared.

EXAMPLE 1

*2-(4-chlorophenoxy)-2-methyl-1-propanol*

A two-liter, three-neck, round-bottom flask fitted with a mechanical stirrer, a reflux condenser with a calcium chloride tube and a dropping funnel, is swept out with dry nitrogen gas and flame dried. Into this system is placed 4.5 g. (0.12 mole) of finely powdered lithium aluminum hydride and 400 ml. of anhydrous ethyl ether. 4-chlorophenoxy-isobutyric acid (15.0 g., 0.07 mole) dissolved in 100 ml. of anhydrous ethyl ether is placed in the dropping funnel and added dropwise to the stirred suspension of the lithium aluminum hydride. The reaction is exothermic and the acid solution is added at a rate sufficient to maintain gentle reflux of the solvent. The addition requires about one hour. When the addition is complete, the mixture is stirred, heated at reflux for one hour and excess lithium aluminum hydride is decomposed by dropwise addition of anhydrous ethyl acetate until no further reaction occurs. Finally, the reaction mixture is decomposed by the *cautious* addition of 200 ml. of water. The water-ether mixture is stirred 15 minutes and then acidified with dilute hydrochloric acid. The layers are separated, and the ether phase is washed well with saturated sodium bicarbonate solution and water. After drying over anhydrous magnesium sulfate, the ether is evaporated on steam and the residue twice distilled in vacuo. There is thus obtained 12.5 g. (90%) of 2-(4-chlorophenoxy)-2-methyl-1-propanol as a colorless oil boiling at 100–101° C./0.5 mm. Hg; $n_D^{24}$ 1.5305.

By substituting the appropriate phenoxy substituted alkanoic acid reactants for the 4-chlorophenoxyisobutyric acid employed in Example 1 and following substantially the procedure described therein, all of the phenoxy substituted alkanol products described supra may be prepared. The following equation illustrates the reaction of Example 1 and the accompanying Table I depicts the phenoxy substituted alkanoic acid reactants and the corresponding phenoxy substituted alkanol products produced thereby:

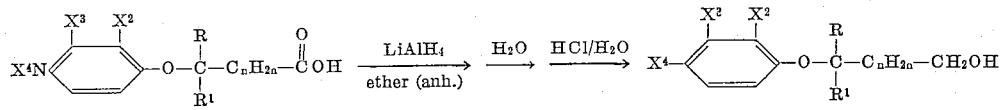

TABLE I

| Example | R | R¹ | —$C_nH_{2n}$— | X² | X³ | X⁴ |
|---|---|---|---|---|---|---|
| 2 | —CH₃ | —CH₃ | | H | —CF₃ | H |
| 3 | —CH₃ | —CH₃ | | H | H | —CH₃ |
| 4 | —CH₃ | —C₂H₅ | | H | H | —OCH₃ |
| 5 | —CH₃ | —CH₃ | | —C₆H₅ | H | H |
| 6 | —C₂H₅ | —CH₃ | | —CH₂—C₆H₅ | H | H |
| 7 | —C₃H₇ | —CH₃ | | H | H | —O—C₆H₅ |
| 8 | —CH₃ | —C₂H₅ | —CH₂— | —O—CH₂—C₆H₅ | H | H |
| 9 | —C₂H₅ | —C₂H₅ | | H | Cl | H |
| 10 | —C₂H₅ | —CH₃ | —CH₂—CH₂— | —CH=CH₂ | H | H |
| 11 | —CH₃ | —CH₃ | | Cl | H | Cl |
| 12 | —CH₃ | —CH₃ | | H | —CH₃ | Cl |
| 13 | —CH₃ | —C₂H₅ | | H | H | Cl |
| 14 | —C₃H₇ | —C₃H₇ | | H | H | Cl |
| 15 | —CH₃ | —CH₃ | | H | H | —O—CH₂—C₆H₅ |
| 16 | —CH₃ | —CH₃ | | —CH=CH—CH=CH— | | H |
| 17 | —C₃H₇ | —CH₃ | —CH₂— | H | H | —CH=CH—C₆H₅ |
| 18 | —CH₃ | —CH₃ | | H | H | —C₄H₃S |
| 19 | —CH₃ | —C₃H₇ | | —SCH₃ | H | H |
| 20 | —CH₃ | —CH₃ | | —CH₃ | H | —CH₃ |
| 21 | —CH₃ | —CH₃ | | —OCH₃ | H | —CH₂—CH=CH₂ |
| 22 | —CH₃ | —CH₃ | | —OCH₃ | H | —CH=CH—CH₃ |
| 23 | —CH₃ | —CH₃ | | H | —CH₃ | —CH₃ |
| 24 | —CH₃ | —CH₃ | | Cl | Cl | Cl |
| 25 | —CH₃ | —CH₃ | | H | H | —CH=CH—C₆H₅ |

It will be apparent from the foregoing description that the phenoxy substituted alkanols of this invention constitute a valuable class of compounds which have not been prepared heretofore. One skilled in the art will also appreciate that the processes disclosed in the above examples are merely illustrative and are capable of wide variation and modification without departing from the spirit of this invention.

What is claimed is:

1. A compound of the formula:

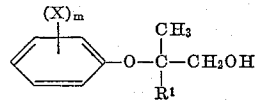

wherein R¹ is a lower alkyl; X is halogen; and $m$ is an integer having a value of 1–3.

2. A compound of the formula:

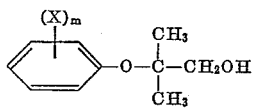

wherein R¹ is lower alkyl; X is halogen; and $m$ is an of 1–3.

3. 2-(4-chlorophenoxy)-2-methyl-1-propanol.

References Cited

UNITED STATES PATENTS 2,850,480   9/1958   D'Alelio.
2,868,843   1/1959   Moyle.
3,188,338   6/1965   Gilbert et al. _____ 269—458

BERNARD HELFIN, *Primary Examiner.*

CHARLES B. PARKER, LEON ZITVER, *Examiners.*

D. R. PHILLIPS, *Assistant Examiner.*